United States Patent [19]
Tanner

[11] 4,338,703
[45] Jul. 13, 1982

[54] SUPPORTING DEVICE

[76] Inventor: James H. Tanner, Rte. 1, Waycross, Ga. 31501

[21] Appl. No.: 175,942

[22] Filed: Aug. 7, 1980

[51] Int. Cl.³ .............................................. A22B 5/06
[52] U.S. Cl. ...................................... 17/44; 254/325; 294/79
[58] Field of Search ...................... 17/24, 44, 44.2, 14; 254/325; 294/79

[56]  References Cited
U.S. PATENT DOCUMENTS
2,485,929 10/1949 Siegrist ............................ 17/44.1 X FOREIGN PATENT DOCUMENTS
1273359 7/1968 Fed. Rep. of Germany ........ 294/79

Primary Examiner—Willie G. Abercrombie
Attorney, Agent, or Firm—Burns, Doane, Swecker & Mathis

[57] ABSTRACT

The present invention relates to a supporting device, particularly for game animals, which comprises first and second elongated members. A first end of the second elongated member is attached perpendicularly to a first end of the first member. A first, stationary cross bar is attached perpendicularly to a second end of the second member. In a preferred embodiment, of the present invention the first elongated member is rotatably received within a sleeve. In a further preferred embodiment a second cross bar, movable toward and away from the first, stationary cross bar, is displaced by a cable and a winch. A pair of chains having ends of the stationary and second movable cross bar passed through appropriate links of each of the chains selectively holds the movable cross bar against downward vertical movement with respect to the stationary cross bar and limits pivotal and rotational movement of the movable cross bar about the cable. The supporting device of the present invention is adapted to be received in a slot typically provided in a side wall of a bed of a truck or attached to a screw arranged on any suitable support device. In a simplified embodiment of the present invention, the movable cross bar, the chains, the cable, and the winch are eliminated and the stationary cross bar is used to support an animal. In addition, a pair of braces are arranged to further stabilize the stationary cross bar.

14 Claims, 7 Drawing Figures

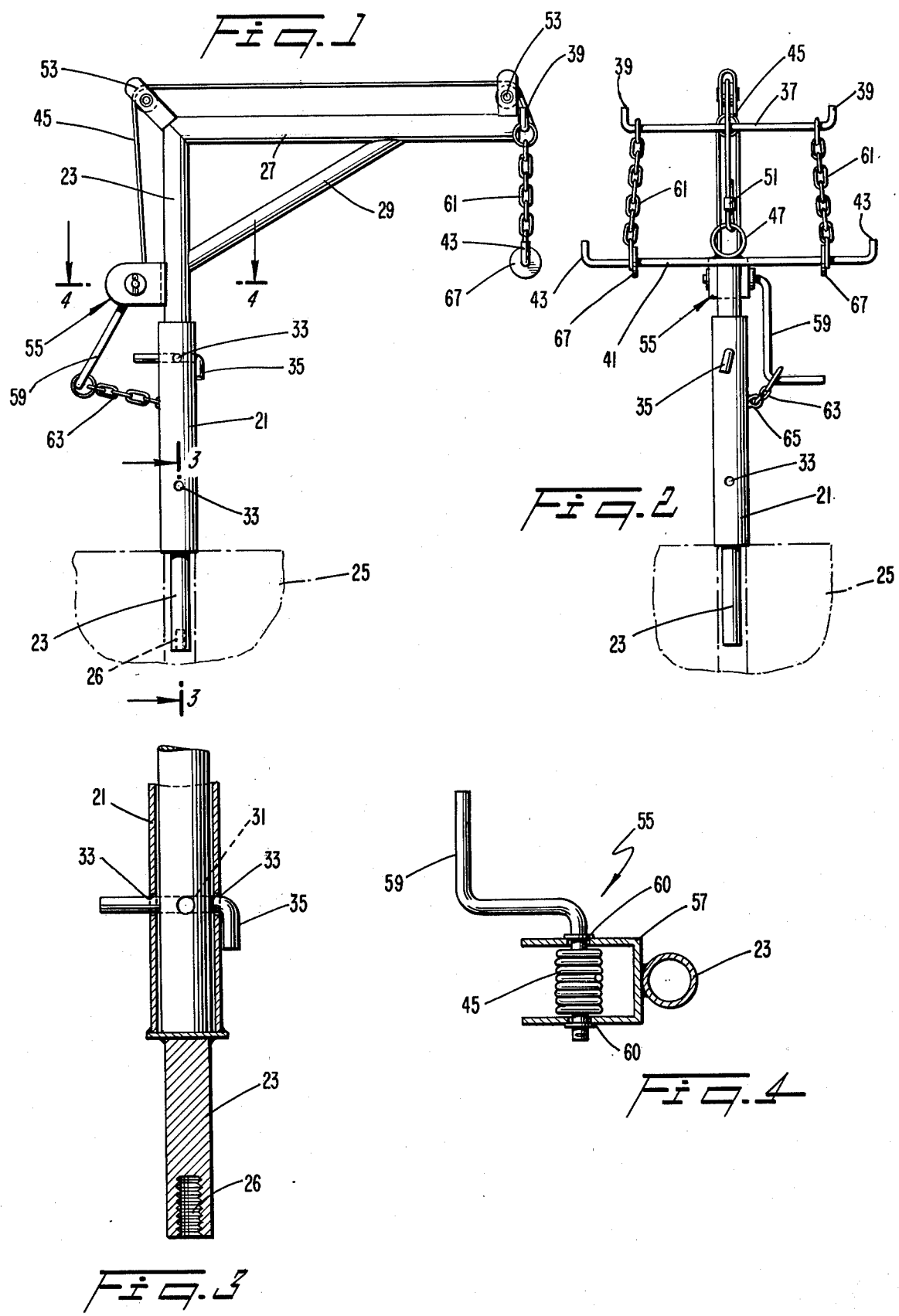

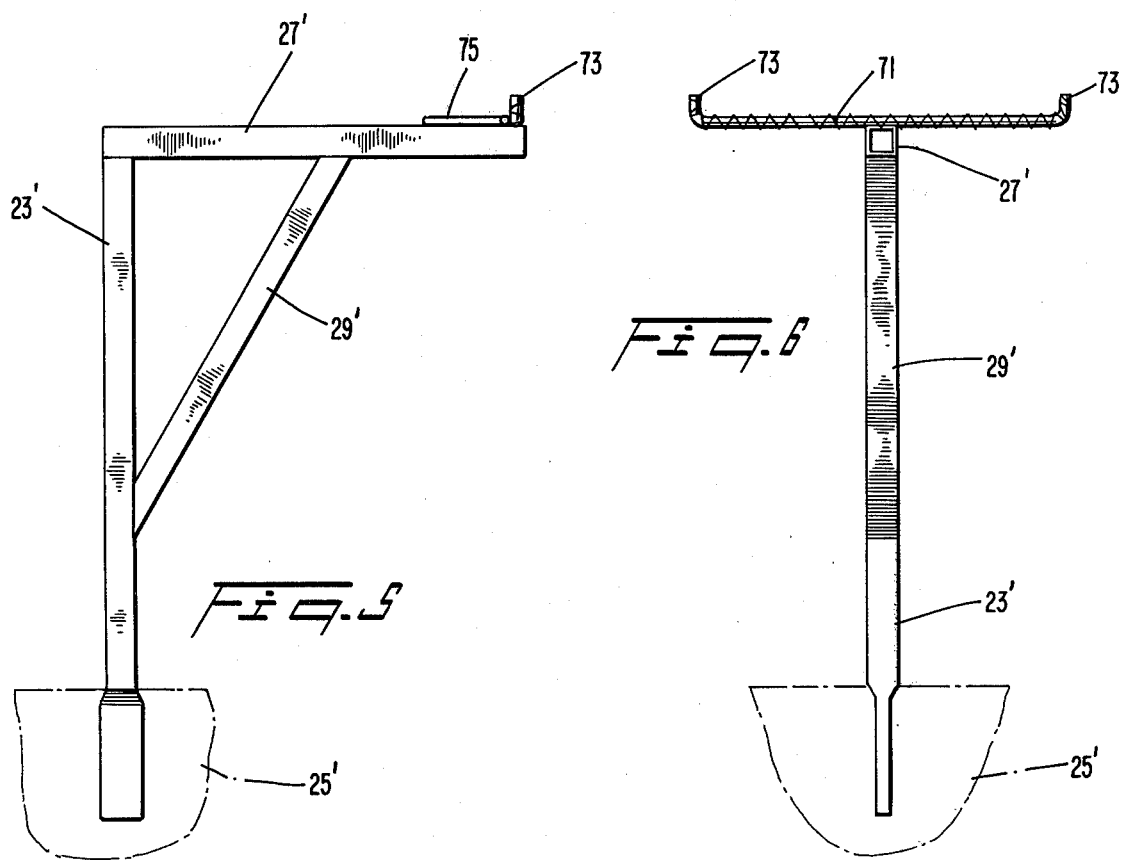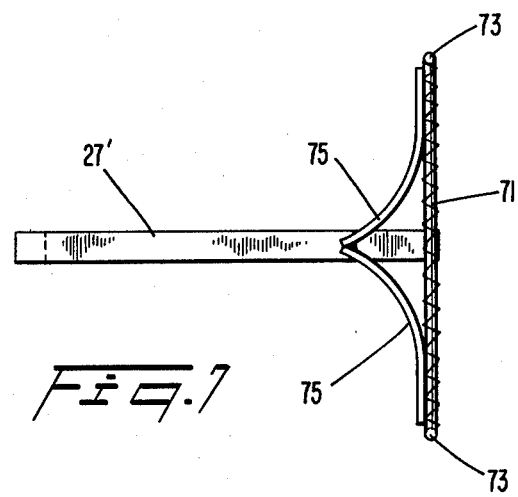

SUPPORTING DEVICE

BACKGROUND AND SUMMARY OF THE PRESENT INVENTION

The present invention relates to a supporting device for suspending an object such as a slain animal. More particularly, the present invention relates to a supporting device for suspending relatively large game animals such as deer which device holds a deer at a desired height to facilitate skinning and butchering of the animal.

Various devices have been proposed which will support a large animal during skinning and butchering. However, some of these devices have been very bulky or complex while others have been inconvenient to use since no mechanism is provided for lifting the animal up into a supported position.

U.S. Pat. No. 3,854,168 issued on Dec. 17, 1974 to Bradley, discloses a skinning tree which may be mounted upon a tree or a vehicle bumper. The skinning tree has a spreader bar which is suspended from an arched support and attached to a hoist to lift the animal off the ground. The base in the device of the Bradley patent permits only limited pivotal movement of the arched support and the animal, when in a suspended position, is free to rotate about the support.

U.S. Pat. No. 3,894,313 issued on July 15, 1975 to Miller, discloses a collapsible frame for suspending a deer or another game animal in the field. A hanger is suspended from a block and tackle to hoist the prey. The game animal is free to rotate after being suspended.

Other devices for suspending various small or large game animals are disclosed in U.S. Pat. Nos. 4,059,869 issued to Dunstheimer; 3,765,630 issued to Woolley; 3,696,939 issued to Drowatzky; 3,188,130 issued to Pietrowicz; and 3,137,030 issued to Varner. These devices, however, are considered to be cumbersome or difficult to use and typically require lifting the animal onto the hanging device by hand.

Therefore, it is an object of the present invention to provide a device for suspending game animals which is both simple to use and simple to construct.

A further object of the present invention is to provide a device which, upon suspending the prey, holds the prey in a relatively stationary position thereby permitting the hunter to walk freely around the prey without having to balance the prey by hand at the same time.

Still a further object of the present invention is to provide a supporting device which can be used by persons of relatively little strength. A further object of the present invention is to provide a supporting device which can be used for both suspending an animal during skinning in the field and for holding the animal during transportation to a remote location for skinning.

Another object of the present invention is to provide a device which is readily adaptable to several mounting positions. More particularly, it is an object of the present invention to provide a supporting device which can be arranged in a side wall of a truck bed or attached to a bumper of a truck or other vehicle.

It is also an object of the present invention to provide a supporting device which is attractive and easily mounted and dismounted from a support such as a truck body.

These and other objects are accomplished by a supporting device according to a first preferred embodiment of the present invention comprising a first enlongated member and a second elongated member having a first end fixed to a first end of the first elongated member (preferably so as to form an inverted "L"). A first cross bar is permanently arranged perpendicularly to a second end of the second member. A second cross bar is movable toward and away from the first cross bar. A cable having one end attached to a central section of the second or movable cross bar is received by a winch for raising and lowering the movable cross bar. A pair of chains are arranged to selectively hang the movable cross bar from the first or stationary cross bar at a predetermined location and to selectively limit pivotal and rotational movement of the movable cross bar. In a further preferred embodiment, both the stationary and movable cross bars have upturned sections at each end. An additional chain is provided to selectively prevent rotation of a hand crank for the winch.

In another preferred embodiment, a sleeve is arranged around the first member to permit the first member to rotate about a longitudinal axis of the first member. At least one pin arranged through aligned bores of both the sleeve and the first member selectively holds the first member against further rotational and longitudinal movement relative to the sleeve.

In operation of a preferred embodiment of a supporting device of the present invention, when used to support an animal, the first elongated member is arranged generally vertically on a support. The pair of chains are unhooked from the stationary cross bar thereby permitting the movable cross bar and the chains to be lowered by turning the hand crank for the winch to unwind the cable. When the movable cross bar reaches the ground, the ends of the movable cross bar are inserted into slits made in respective hind legs of an animal to be supported. The hand crank for the winch is then turned to raise the animal to a free hanging position. When the desired height has been reached, the additional chain is hooked over the hand crank to prevent rotation of the hand crank. An appropriate link of each of the chains is hooked over a respective end of the stationary cross bar to hold the animal supported on the movable cross bar against further vertical movement. The chains also provide an apparatus for limiting pivotal and rotational movement of the animal about the cable as the animal hangs in the suspended position. In this way, the user of the device can walk freely around the suspended animal without having to hold the animal against rotation by hand.

In a further simplified embodiment of the present invention, the movable cross bar, the chains, the cable, and the winch are eliminated. The stationary cross bar is used as the support for the object. In addition, a pair of braces are secured between the second member and the stationary cross bar to further support the stationary cross bar.

The apparatus of the present invention is preferably arranged so that a second end of the first elongated member is either received in a slot typically provided in a sidde wall of a bed of a truck or attached to a bumper of a truck or another suitable support. If it is desired to skin the suspended animal immediately, the supporting device of the present invention holds the animal relatively stationary thereby facilitating skinning. However, if it is desired to skin the animal at some remote location or time, the supporting device of the present invention may be rotated by removing the pin holding the first elongated member and rotating the first member within the sleeve so that the animal will lie within the bed of the truck while still being supported on the movable cross bar. The pin may then be reinserted to hold the first member against further rotational movement within the sleeve.

BRIEF DESCRIPTION OF THE DRAWINGS

Preferred embodiments of a supporting device according to the present invention will be described with reference to the accompanying drawings wherein like members bear like reference numerals and wherein:

FIG. 1 is a side view of a first embodiment of the present invention;

FIG. 2 is a front view of the embodiment of FIG. 1;

FIG. 3 is a cross sectional view taken along the line 3—3 in FIG. 1;

FIG. 4 is a cross sectional view of a winch taken along the line 4—4 in FIG. 1;

FIG. 5 is a side view of a second embodiment of the present invention;

FIG. 6 is a front view of the embodiment of FIG. 5; and

FIG. 7 is a top view of the embodiment of FIG. 5.

DETAILED DESCRIPTION OF THE PREFERRED EMBODIMENTS

With reference to FIG. 1, a supporting device according to the present invention includes a sleeve 21 which slidably receives a first elongated member 23 which extends through the sleeve 21. The first member 23 extends both above and below the sleeve 21. As shown in FIG. 1, the first member 23 engages a hole or slot in a support 25 (showwn in phantom in FIG. 1) which could, for example, be a slot typically provided in a side wall of a bed of a pickup truck. Alternatively, the first member 23 could be attached to a threaded male member extending from another support, for example, a bumper of a truck, by internal threads 26 arranged at a first end of the first elongated member 23.

A second elongated member 27 is fixedly attached perpendicularly to a second end of the first member 23. A brace 29 has a first end which is connected to the first member 23 and a second end which is connected to the second member 27 to lend further stability and support to the second member 27. In a preferred embodiment, when the supporting device of the present invention is arranged on the support 25, the first member 23 is generally vertical and the second member 27 is generally horizontal.

The outside diameter of the first member 23 is preferably slightly less than the inside diameter of the sleeve 21 so that the first member 23 is free to rotate about is longitudinal axis within the sleeve 21 to alter the angular orientation of the second elongated member 27. The first member 23 contains a plurality of bores 31 which pass through the first member 23 along diameters of the first member 23 at various axial and angular locations over a portion of the length of the first member 23 which portion lies within the sleeve 21. The sleeve 21 also contains a plurality of bores 33 which pass through diameters of the sleeve 21 at various axial and angular locations. The bores 33 in the sleeve 21 are selectively alignable with the bores 31 in the first member 23.

As best seen in FIG. 3, a pin 35 is passed through one of the bores 33 in the sleeve 21 and an aligned bore 31 in the first member 23. In this way, the first member 23 is held against rotational and longitudinal movement with respect to the sleeve 21 by the pin 35. When it is desired to change the angular orientation of the second member 27, the pin 35 is removed and the first member 23 is rotated until another one of the bores 31 aligns with an appropriate bore 33 in the sleeve 21 so that the pin 35 can be reinserted. It may also be desirable to provide a lock on the pin 35 (not shown) to prevent theft of the apparatus which would be effective if the sleeve 21 is secured to the support 25.

With reference to FIG. 2, a stationary cross bar 37 is attached perpendicularly to a free end of the second member 27. A movable cross bar 41 is arranged for movement toward and away from the stationary cross bar 37. The stationary cross bar 37 has a relativelyy short section 39 at each end which sections are oriented in the same direction at approximately a 90° angle to a longitudinal axis of the stationary cross bar 37. The movable cross bar 41 also has a relatively short section 43 at each end which sections are oriented in the same direction at approximately a 90° angle to a longitudinal axis of the movable cross bar 41. In a preferred operating arrangement of the supporting device, i.e., with the second member 27 arranged horizontally, the short sections 39, 43 are oriented vertically upwardly. In other words, each of the sections 39, 43 is upturned. When the present device is used to support an animal, the movable cross bar 41 is conveniently called a skinning or spreader bar. It should be noted that the stationary cross bar 37 may also be utilized as a skinning bar.

The movable cross bar 41 is supported by a cable 45 which has one end looped around a ring 47 and held by a suitable clamp 51. The ring 47 is securely fixed to a central section of the movable cross bar 41. The cable 45 passes over a plurality of rollers 53 arranged generally along an upper surface of the second member 27. The other end of the cable 45 is received in a winch 55.

The winch 55 (FIG. 4) includes a carriage 57 which is attached by any suitable connection e.g., welding, to the first member 23. The carriage 57 rotatably supports a hand crank 59 which winds and unwinds the cable 45. The hand crank 59 is held at each side of the carriage 57 by suitable elements 60. Alternatively, a suitable, conventional ratcheting winch may be provided if desired.

Again with reference to FIGS. 1 and 2, two chains 61 are provided to hang the movable cross bar 41 from the stationary cross bar 37. Each of the upturned sections 39 of the stationary cross bar 37 is selectively passed through a link near one end of a respective one of the chains 61. Each of the upturned sections 43 of the movable cross bar 41 is selectively passed through a link near the other end of the respective one of the chains 61. In this way, the chains 61 prevent downward vertical movement of the movable cross bar 41 and limit the pivotal and rotational movement of the movable cross bar 41 about the cable 45.

The movable cross bar 41 is preferably made longer than the stationary cross bar 37. Also, a stop 67 is provided near each end of the movable cross bar 41 and is spaced inwardly from the upturned section 43 such that when the movable cross bar 41 is suspended beneath the stationary cross bar 37 by the chains 61, each of the stops 67 is arranged approximately vertically underneath a respective upturned section 39 of the stationary cross bar 37. In this way, when the chains 61 are arranged with the ends of the two cross bars passed through appropriate links of the chains 61, the chains 61 taper slightly outwardly. The outward taper of the chains 61 improves the ability of the chains to limit the pivotal movement of the movable cross bar 41 about the cable 45.

A third chain 63 is provided to selectively prevent rotation of the hand crank 59. A hook 65 is passed through a link at one end of the third chain 63 and is secured to the sleeve 21. The hand crank 59 is adapted to be placed through an appropriate link at the other end of the third chain 63 to selectively prevent rotation of the hand crank 59.

The operation of the device of FIGS. 1-6 will be described with reference to supporting a game animal although it will be understood that the apparatus of the present invention may be used to support other objects. The apparatus of the present invention is first placed within a suitable support 25 and secured in the desired angular location, i.e., with the second member 27 extending outwardly from the support 25, by the pin 35. The third chain 63 is unhooked from the hand crank 59 and the links on the chains 61 are withdrawn from the upturned sections 39 of the stationary cross bar 37. The movable cross bar 41 and the chains 61 are then lowered by turning the hand crank 59 in an appropriate direction to unwind the cable 45. When the movable cross bar 41 has reached the ground, the animal to be supported has one of the upturned sections 43 on the movable cross bar 41 placed through a slit in one hind leg of the animal. The leg is slid along the longitudinal axis of the movable cross bar 41 until the leg abuts the respective chain 61 and stop 67 on the movable cross bar 41. The other upturned section 43 is mounted similarly through a slit in the other leg of the animal.

The operator then turns the hand crank 59 in the opposite direction to wind the cable 45 thereon and to raise the movable cross bar 41 and the animal above the ground until the animal reaches a free hanging position. The end of the hand crank 59 is then placed through an appropriate link of the third chain 63 to prevent rotation of the hand crank 59. Each of the upturned sections 39 of the stationary cross bar 37 is then placed through a suitable link of a respective one of the chains 61 to prevent downward vertical movement of the movable cross bar 41 and to limit rotational and pivotal movement of the movable cross bar 41 about the cable 45.

By operating the supporting device of the present invention in the above manner, the chains 61 are held on the movable cross bar 41 by the hind legs of the animal. In other words, there is little likelihood that the chains 61 will slip off of the movable cross bar 41. Alternatively, the chains 61 can be removed from the movable cross bar 41 prior to lowering the movable cross bar 41 and then reconnected to the movable cross bar 41 after the upturned sections 43 of the movable cross bar 41 have been placed through the hind legs of the animal and the movable cross bar 41 has been raised by the cable 45 and the winch 55. However, by placing the chains 61 on the outside of the hind legs of the animal, there may be a greater tendency for the chains 61 to slip off of the upturned sections 43 due to the curvature of the movable cross bar 41 caused by the weight of the suspended animal.

It should be noted that because of the chains 61 which hold the movable cross bar 41, the animal does not swing freely about the cable 45. In this way, it is not necessary for the operator to hold the animal by hand at all times while skinning and butchering the animal. In other words, once the animal has been suspended, the animal is held in a vertical, free hanging position and the operator can move freely about the animal.

If it is desired to move the animal to another location for skinning and butchering, the pin 35 is removed and the first member 23 is rotated within the sleeve 21 so that the second member 27 extends over a truck bed and the animal can be deposited into the bed of a truck or another suitable vehicle upon which the supporting device is arranged. The pin 35 may then be reinserted through the appropriate aligned bores 31, 33 to hold the supporting device against further movement relative to the sleeve 21.

The embodiment illustrated in FIGS. 5-7 is a simplified version of the embodiment of FIGS. 1-4. A first end of a first member 23' is arranged in a suitable support 25'. A first end of a second member 27' attached perpendicularly to a second end of the first member 23' extends outwardly therefrom and is further supported by a brace 29' connected between the first and second members 23', 27', respectively. A stationary cross bar 71 having ribbing thereon of the type typically found on steel reinforcing rods is attached to a second end of the horizontal member 27'. The stationary cross bar 71 has an upturned section 73 at each end which upturned sections 73 are adapted to receive the legs of an animal to be supported. The ribbing arranged on the stationary cross bar aids in preventing slippage of the legs along a longitudinal axis of the stationary cross bar 71.

A pair of curved braces 75, each of the braces 75 being fixedly attached to an upper surface of the second member 27' and extending outwardly toward respective ends of the stationary cross bar 71, add additional support to the stationary cross bar 71 to limit bending of the cross bar 71 when an animal is supported on the cross bar 71. While the rotary connection of the first member within a sleeve described with reference to FIGS. 1-4 is not illustrated in the embodiment of FIGS. 5-7, it will be apparent to one of ordinary skill that a similar rotary connection may be employed in the embodiment of FIGS. 5-7.

In operation of the device of FIGS. 5-7, the animal or other object to be supported, is lifted up to the stationary cross bar 71. Each of the upturned sections 73 is inserted through a slit formed in a respective one of the hind legs of the animal. This device is much less complex and thus much less expensive to manufacture than the device illustrated in FIGS. 1-4 but may require two people to lift the animal up to the stationary cross bar 71.

The principles and preferred embodiments of the present invention have been described in the foregoing specification. However, the invention which is intended to be protected is not to be construed as limited to the particular embodiments disclosed. The embodiments are to be regarded as illustrative rather than restrictive. Variations and changes may be made by those skilled in the art without departing from the spirit of the invention. Accordingly, it is expressly intended that all such variations and changes which fall within the spirit and scope of the present invention as defined in the appended claims be embraced thereby.

What is claimed is:

1. A supporting device comprising:
   a first enlongated member;
   a second elongated member having a first end fixedly attached perpendicularly to a first end of the first member;
   a first cross bar fixedly attached perpendicularly to the second member at a second end of the second member; and means for mounting the first member to a support such that the first member is rotatable about a longitudinal axis of the first member, said means for mounting comprising a sleeve arranged around a portion of the length of the first member;

a first plurality of bores arranged along diameters of the sleeve;

a second plurality of bores arranged along diameters of the first member, each of said second plurality of bores being adapted to selectively align with one of the first plurality of bores in the sleeve; and a removable pin for selectively holding the first member against rotational and longitudinal movement relative to the sleeve, said pin being selectively engagable with the first member and the sleeve through one of the first plurality of bores in the sleeve and an aligned one of the second plurality of bores in the first member.

2. The supporting device of claim 1 further comprising:

a second cross bar; and means for adjustably suspending the second cross bar with respect to the second elongated member, said second cross bar being movable toward and away from the first cross bar.

3. A supporting device comprising:

a first elongated member;

means for rotatably mounting the first member such that said first member is rotatable about a longitudinal axis of the first member;

a second elongated member having a first end fixedly attached perpendicularly to a first end of the first member;

a first cross bar fixedly attached perpendicularly to the second member at a second end of the second member;

a second cross bar;

means for adjustably suspending the second cross bar with respect to the second elongated member, said second cross bar being movable toward and away from the first cross bar; and first holding means for selectively maintaining the second cross bar at a predetermined location with respect to the first cross bar, said first holding means also limiting pivotal and rotational movement of the second cross bar when maintaining the second cross bar at said predetermined location.

4. The supporting device of claim 3 wherein the first holding means comprises first and second chains, said first and second chains each having a first link selectively engagable with a respective end of the first cross bar and a second link selectively engagable with a respective end of the second cross bar.

5. The supporting device of claim 4 wherein each of the first and second cross bars has a relatively short section at each end which sections on each cross bar are oriented in the same direction at approximately a 90° angle to a longitudinal axis of a respective cross bar.

6. The supporting device of claim 4 wherein the second cross bar has a relatively short section at each end which sections are oriented in the same direction at approximately a 90° angle to a longitudinal axis of the second cross bar, and further comprising, first and second stop means arranged on the second cross bar near respective short sections for limiting movement of said chains along the longitudinal axis of the second cross bar.

7. A supporting device comprising:

a first elongated member;

a second elongated member having a first end fixedly attached generally perpendicularly to a first end of the first member;

a first cross bar fixedly attached generally perpendicularly to the second member at a second end of the second member;

a second cross bar; and means for adjustably suspending the second cross bar with respect to the second elongated member, said second cross bar being movable toward and away from the first cross bar; and holding means for selectively maintaining the second cross bar at a predetermined location with respect to the first cross bar, said holding means directly interconnecting said first and second cross bars, said holding means also limiting pivotal and rotational movement of the second cross bar when maintaining the second cross bar at said predetermined location.

8. The supporting device of claim 7 wherein the means for adjustably suspending the second cross bar comprises a cable having one end connected to the second cross bar at a central location thereon and having the other end received by winch means for selectively winding and unwinding the cable, said winch means being attached to one of said first and second members.

9. The supporting device of claim 8 wherein said winch means includes a rotatable hand crank and further comprises second holding means for selectively preventing rotation of the hand crank.

10. The supporting device of claim 1 further comprising means for bracing the second member with respect to the first member.

11. The supporting device of claim 1 wherein the first member includes means for facilitating engagement with a support.

12. The supporting device of claim 11 wherein the means for facilitating engagement with the support comprises threads arranged at a second end of the first member.

13. A supporting device comprising:

a first elongated member;

a second elongated member having a first end fixedly attached generally perpendicularly to a first end of the first member;

a first cross bar fixedly attached generally perpendicularly to the second member at a second end of the second member;

a second cross bar;

means for adjustably suspending the second cross bar with respect to the second elongated member, said second cross bar being movable toward and away from the first cross bar; and holding means for selectively maintaining the second cross bar at a predetermined location with respect to the first cross bar, said holding means also limiting pivotal and rotational movement of the second cross bar when maintaining the second cross bar at said predetermined location, said holding means comprises first and second chains, said first and second chains each having a first link selectively engageable with a respective end of the first cross bar and a second link selectively engagable with a respective end of the second cross bar.

14. The supporting device of claim 13 wherein each of said first and second cross bars includes a relatively short section at each end which sections on each cross bar are oriented in the same direction at approximately a 90° angle to a longitudinal axis of the respective cross bar, the second cross bar being longer than the first cross bar, and first and second stops arranged along the second cross bar and spaced a distance apart approximately equal to the length of the first cross bar.

* * * * *